Patented May 15, 1951

2,552,551

UNITED STATES PATENT OFFICE 2,552,551

LIGHT STABLE COMPOSITIONS COMPRISING POLYMERIC VINYLIDENE CHLORIDE OR VINYL CHLORIDE

Carl B. Havens, Hope, Mich., assignor to The Dow Chemical Company, Midland, Mich., a corporation of Delaware No Drawing. Application October 29, 1949, Serial No. 124,505

6 Claims. (Cl. 260—45.95)

This invention relates to compositions of improved light stability comprising polymeric vinylidene chloride, polymeric vinyl chloride, copolymers wherein these compounds are present in substantial amount, and certain alkaline earth salts of substituted 2-hydroxybenzophenones. It relates in particular to an improvement over the composition described by Thomas Houtman, Jr. in U. S. Patent No. 2,434,496. It is correctly stated in said patent that the polymer of vinylidene chloride, the polymer of vinyl chloride, and copolymers containing either of these compounds are subject to a certain amount of darkening and decomposition when exposed for prolonged periods to the effects of light. These undesirable effects are particularly noticeable when dealing with the polymeric substances in a thin section, such as is found in films and filaments. Various protective agents have been proposed in the past to overcome this difficulty, but none of them has been as satisfactory as might be desired. About the best of the light stabilizers, heretofore proposed for vinylidene chloride polymers, has been the compound 2-hydroxy-5-chlorobenzophenone. This compound has afforded substantial protection against the effects of light, but it has the inherent disadvantage of being washed out of the polymer during laundering and dry cleaning operations by reason of its solubility in alkaline detergent solutions and in such dry cleaning solvents as carbon tetrachloride or trichloroethylene.

It is accordingly among the objects of the present invention to provide a vinylidene chloride or a vinyl chloride polymer composition containing a light stabilizer which will afford maximum protection and, at the same time, will not dissolve out of the composition during laundering or dry cleaning operations. A related object is to provide such a composition which is stable both to the ultra violet light from artificial sources and that contained in direct sunlight, so that the composition may be stable toward any light to which it may be subjected.

It has now been found that the foregoing and related objects may be attained through the use in the polymer composition of a particular type of benzophenone derivative which always has substituents in the 2,5- and the 2',5'-position and which has the general formula

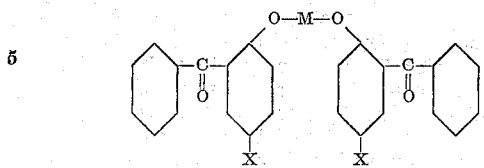

wherein M is a metal selected from the alkaline earth group consisting of magnesium, strontium, calcium, and barium and X is a member of the group consisting of hydrogen, chlorine, and an alkyl radical containing one to four carbon atoms. Specific examples of compounds falling within the above generic formula and which have all been found useful for the herein described purpose are: calcium salt of 2-hydroxy-5-chlorobenzophenone, barium salt of 2-hydroxy-5-chlorobenzophenone, strontium salt of 2-hydroxy-5-chlorobenzophenone, magnesium salt of 2-hydroxy-5-chlorobenzophenone, calcium salt of 2-hydroxybenzophenone, calcium salt of 2-hydroxy-5-methylbenzophenone, calcium salt of 2-hydroxy-5-ethylbenzophenone, calcium salt of 2-hydroxy-5-propylbenzophenone, and the calcium salt of 2-hydroxy-5-butylbenzophenone. Methods whereby compounds of this type may be prepared are known in the prior art.

The above-identified benzophenone compounds may be employed as stabilizers in amounts which vary from about 0.5 up to about 10 per cent, based on the weight of the polymer or copolymer being treated. It has been found that from 1 to 5 per cent of the stabilizer compound is sufficient to provide the desired protection, in most cases.

The manner of adding the stabilizing agent to the polymeric composition is not critical to the present invention. Thus, the stabilizing agents may be dispersed in an organic solvent or plasticizer and distributed through the polymer mass on compounding rolls, or the stabilizer may be added in powder form to the powdered polymer and distributed uniformly through the mass in any suitable blending device such as a ball mill or other available mixing apparatus.

Regardless of the manner in which the new stabilizers are added to the polymeric product, it has been found that they exhibit the desired stabilizing effect on the polymeric material when the latter has been fabricated and is exposed to light. Furthermore, they are not dissolved out of the fabricated polymeric product when the latter is exposed to laundering and dry cleaning agents. While an untreated film or filament made from a vinylidene chloride polymer or from a vinyl chloride polymer may assume a dark brown or black color after prolonged exposure to sunlight or to ultra violet radiations from artificial sources, the compositions containing relatively small amounts of the new stabilizers, when exposed in the same manner and in the same physical form, have been found to resist discoloration for prolonged periods which in the case of sunlight exposure, have extended for several months.

The following examples illustrate the practice of the invention:

EXAMPLE 1

A copolymer of about 85 per cent vinylidene chloride and about 15 per cent vinyl chloride, in powder form, was compounded with a given per cent by weight, based on the polymer, of an indicated light stabilizer in a dispersing medium such as acetone. This mixture was dried at 70° C. for 2 hours. A flow molding 0.01 inch thick was made from the dried polymeric composition.

A sample of film molded as above containing 3 percent of 2-hydroxy-5-chlorobenzophenone as the light stabilizer was boiled in carbon tetrachloride for one-half hour. This resulted in a film weight loss of 2.3 per cent. A newly prepared sample of equal weight as above of film containing 3 per cent of the calcium salt of 2-hydroxy-5-chlorobenzophenone, when boiled for one-half hour in carbon tetrachloride resulted in no weight loss. A similar ratio in weight losses is observed when alkaline solutions, as used in laundering, are substituted for carbon tetrachloride in treating samples of the above two film compositions. The significant losses in weight of film after treatment with cleansing solvents are typically a measure of the extractability of many light stabilizers heretofore used in polymeric compositions. In contrast to this, the non-extractability of alkaline earth salts of substituted 2-hydroxybenzophenone from polymeric compositions, as illustrated in the above example by the calcium salt of 2-hydroxy-5-chlorobenzophenone, is an unusual and useful attribute of a proven light stabilizer. Evidence of the light stability of alkaline earth salts of 2-hydroxy-5-chlorobenzophenone may be found in Table 1 below.

EXAMPLE 2

By way of illustration, a copolymer of vinylidene chloride and vinyl chloride, as in Example 1, was intimately mixed with 5 per cent by weight based on the polymer used, of one of the defined alkaline earth salts of 2-hydroxy-5-chlorobenzophenone. Each such composition was molded into films of uniform thickness (about 0.01 inch). A blank, containing only the copolymer, was prepared and molded under the same conditions as the other compositions. Samples of all the compositions were exposed about two months to all available direct sunlight at a latitude of 44° north. The degree of light stability was judged from the darkening of the various samples and this in turn was evaluated by using an arbitrarily adopted numerical scale from 1 to 8, wherein 1 indicates no change has taken place in the appearance of the sample after exposure and 8 indicates a nearly black sample. Other tests have indicated that the amount of stabilizer may be as little as 0.5 per cent, especially when the lighting conditions to be encountered by the composition are not extreme. Where extreme conditions are encountered, such as the direct rays of a tropical sun over an extended period of time, tests have shown that larger amounts, e. g., up to 10 per cent of the above light stabilizers are desirable.

Table 1

| Added Light Stabilizer | Before Sunlight Treatment | After 2 months Exposure to Sunlight |
|---|---|---|
| Benzophenone, 5-chloro-2-hydroxy, magnesium salt | 1 | 4 |
| Benzophenone, 5-chloro-2-hydroxy, calcium salt | 1 | 3 |
| Benzophenone, 5-chloro-2-hydroxy, strontium salt | 1 | 4 |
| Benzophenone, 5-chloro-2-hydroxy, barium salt | 1 | 4 |
| Blank | 1 | 7 |

Samples of compositions containing the above polymer stabilized with various amounts of the calcium salt of 2-hydroxy-5-chlorobenzophenone and exposed to one month of sunlight, are given in Table 2 below.

Table 2

| Per Cent by Weight of Benzophenone, 5-Chloro-2-Hydroxy, Ca salt added | Before Exposure | After 1 month Exposure to Sunlight |
|---|---|---|
| 0.5 | 1 | 3 |
| 1.0 | 1 | 2 |
| 10.0 | 1 | 1 |
| 0.0 (blank) | 1 | 7 |

The addition of 10 per cent of the calcium salt produces a polymeric composition that is completely light stable at the end of one month of exposure to direct summer sunlight.

Similarly, the polymer of vinylidene chloride alone, when molded as above with various amounts of the same calcium salt, showed good light stability. Table 3 shows compositions comprising polymeric vinylidene chloride and the said calcium salt.

Table 3

| Per Cent by Weight of Benzophenone, 5-Chloro-2-Hydroxy, Calcium Salt | Before Sunlight Treatment | After 1 month Exposure to Sunlight |
|---|---|---|
| 0.5 | 1 | 3 |
| 1.0 | 1 | 3 |
| 10.0 | 1 | 3 |
| 0.0 (blank) | 1 | 7 |

In the same fashion, polymeric vinyl chloride plasticized with 25 per cent by weight of dioctyl phthalate and molded as above with various amounts of the same calcium salt, yielded compositions of good light stability as Table 4 demonstrates.

Table 4

| Per Cent by Weight of Benzophenone, 5-Chloro-2-Hydroxy, Ca Salt | Before Sunlight Treatment | After 2 months Exposure to Sunlight | After 4 months Exposure to Sunlight |
|---|---|---|---|
| 0.5 | 1 | 4 | 4.5 |
| 2.0 | 1 | 1 | 4 |
| 5.0 | 1 | 2 | 4 |
| 10.0 | 1 | 2 | 4 |
| 0.0 (blank) | 1 | 6 | 7 |

The addition of 2 per cent of the calcium salt produces a polymeric composition comprising vinyl chloride that is completely light-stable to two months of exposure to direct sunlight and shows fair stability at the end of four months.

It is to be understood that the invention is not limited to its use in connection with the copolymers of the preceding examples, and that the new stabilizers are found to afford protection to polyvinylidene chloride and to any polymer in which either vinylidene chloride or vinyl chloride is present in substantial amount (over 10 per cent), and particularly those in which either vinylidene chloride or vinyl chloride predominates, including, for example, such copolymers containing acrylonitrile, ethyl acrylate, methyl acrylate, vinyl acetate, styrene, butadiene, or similar copolymerized ingredients, or mixtures thereof. It is particularly effective with the binary copolymers of vinylidene chloride and vinyl chloride in all proportions.

Since light stability in a polymer may be attained through proper protection of exposed surfaces thereof, it is evident that the stabilizer need not be present throughout the polymeric body if it is present in stabilizing quantities in the surface layers, and that protection may be attained by coating a polymeric vinylidene chloride article or a polymeric vinyl chloride article with a lacquer containing the stabilizer. Such lacquer will preferably, but not necessarily, comprise a soluble vinylidene chloride or vinyl chloride copolymer as the film-forming base. Furthermore, the stabilizer in the lacquer will be insoluble in the usual dry cleaning and laundering agents since the alkaline earth salts of 2-hydroxy substituted benzophenones are insoluble in carbon tetrachloride and in alkaline solutions.

Stabilizing quantities of the new agents have been suggested as varying from 0.5 to 10 per cent of the weight of the treated polymer. Ordinarily, about 5 per cent of stabilizer is preferred.

I claim:

1. A composition of matter comprising a polymer in which at least one polymerized ingredient present in amount over 10 per cent is selected from the class consisting of vinylidene chloride and vinyl chloride, and from 0.5 to 10 per cent of its weight of a salt having the general formula

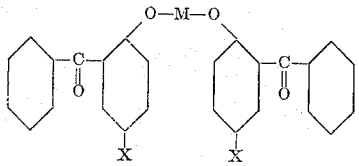

wherein M is an alkaline earth metal and X is the member of the group consisting of hydrogen, chlorine, and alkyl radicals containing from one to four carbon atoms.

2. The composition as claimed in claim 1, wherein the stabilizer is present in an amount of 5 per cent of the weight of the polymer.

3. The composition as claimed in claim 1, wherein the polymer is a copolymer of vinylidene chloride and vinyl chloride.

4. The composition claimed in claim 1, in which the stabilizer is the calcium salt of 2-hydroxy-5-chlorobenzophenone.

5. The composition claimed in claim 1, in which the stabilizer is the magnesium salt of 2-hydroxy-5-chlorobenzophenone.

6. A copolymer of vinylidene chloride and vinyl chloride, stabilized against the injurious effects of light with from 0.5 to 10 per cent of its weight of the calcium salt of 2-hydroxy-5-chlorobenzophenone.

CARL B. HAVENS.

No references cited.